3,161,598
METHOD AND COMPOSITION FOR CHEMICAL RUST REMOVAL
Isidore Geld, Flushing, N.Y., assignor to the United States of America as represented by the Secretary of the Navy
No Drawing. Filed Dec. 11, 1961, Ser. No. 158,616
5 Claims. (Cl. 252—147)
(Granted under Title 35, U.S. Code (1952), sec. 266)

The invention described herein may be manufactured and used by or for the Government of the United States of America for governmental purposes without the payment of any royalties thereon or therefor.

This invention relates to rapid chemical rust removal from the surface of an article that includes iron in a state subject to oxidation to form rust. For purposes of this description, the terms iron, steel and ferrous metal are used to describe a metal that includes iron in a state subject to oxidation to form rust, and notwithstanding the fact that rust generally contains ferric as well as ferrous oxide.

Aqueous acid solutions have been used for a long time for descaling or removing surface rust. A very rapid chemical method of rust removal widely used heretofore was to immerse a ferrous metal article to be rust cleaned in an aqueous solution of hydrochloric acid. While the rate of rust removal increases with the concentration of the hydrochloric acid, an inhibited solution of approximately one part acid and one part water by volume is a concentration generally used. If the hydrochloric acid concentration is substantially higher than 1:1, the rate of acid reaction with the base metal is increased; in addition, concentrated hydrochloric acid fumes, and the health hazard presented by the fumes is of so serious a nature that it is not practical to use hydrochloric acid concentration much in excess of 1:1 for rust removal. Small percentages of inhibitor material on the order of a fraction of one percent have been used in the acid solution for resisting attack of the acid on the base metal. It has been found that the rate of rust removal obtained with a hydrochloric acid solution without inhibitor is more rapid than the rate of rust removal obtained with hydrochloric acid solution that contains an inhibitor. However, the rate of loss of base metal where the acid solution contains no inhibitor is sufficiently higher than where an inhibitor is included that the general practice is to use an inhibitor in the solution, in quantities on the order of a fraction of one percent.

Immersion time on the order of an hour is required for removing a layer of thick tight rust from a flat surface of a ferrous article with an aqueous solution of hydrochloric acid on the order of 1:1 by volume. Though aqueous hydrochloric acid is a very fast acting solution for chemical rust removal, there are specialized rust cleaning operations in which an hour for rust removal is too long. For example, in tasks where a maintenance man is called upon to make a repair and the repair in part requires that a surface area be rust cleaned and where the time for the repair exclusive of rust cleaning is short, i.e., substantially less than an hour, the time required for rust cleaning by the method described is wasteful.

An object of this invention is to shorten the time in which the fastest acting practical chemical rust cleaning solution known heretofore, comprising hydrochloric acid and water approximately 1:1 by volume, can remove rust from the surface of ferrous metal oxide.

Another object is to provide an improved composition for very rapid and economical removal of oxides of iron from ferrous metal surfaces, with minimum danger of damage to such surfaces.

A further object is to provide an improved simple, convenient, practical and very rapid method for the removal of iron oxides from ferrous metal surfaces, with minimum danger of damage to such surfaces.

Other objects and advantages will appear from the following description of an example of the invention, and the novel features will be particularly pointed out in the appended claims.

I have discovered, contrary to expectation, that an aqueous hydrochloric acid solution on the order of 1:1 by volume and containing dissolved therein an inorganic iodide which is substantially soluble therein, such as NaI, KI, $NH_4I$, HI and others of comparable solubility therein, in an amount approaching saturation accelerates rust removal several fold and also corrodes away less base metal than in methods practised heretofore. With reduced iodide the rate of rust removal is reduced. Ordinary rust contains a substantial percentage of trivalent iron and most of it is exterior to the divalent iron. It is postulated that the iodide reduces the trivalent iron in the rust to the more readily soluble divalent iron and in addition, the free iodine that is released in the reaction acts as an inhibitor resisting the attack of the acid on the base metal. The apparent reaction wherein the inorganic iodide is sodium iodide is as follows:

$$6HCl + Fe_2O_3 + 2NaI \rightarrow FeCl_2 + 2NaCl + 3H_2O + I_2$$

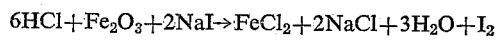

On the order of one percent sodium hypophosphite may be included to improve the composition. The sodium hypophosphite serves to lengthen the shelf life of the solution by inhibiting oxidation of the iodide to iodine by reaction with the air, and also contributes to a minor extent to reduction of the trivalent iron to divalent iron. However, if the solution is used shortly after it is prepared, the sodium hypophosphite may be omitted.

The more rapid rust removal can be clearly seen from the following examples in which were used equal size samples of steel 1/8" x 1" x 2" cut from a large plate that was exposed to the weather for a length of time sufficient for the exposed surface areas to be completely covered with a thick tight coating of rust. The edges were masked against attack by the rust removing solution. These samples were used in the examples described below.

Example 1.—A rust coated sample as described above was immersed in an aqueous hydrochloric acid solution, 1:1 by volume, with no inhibitor, at 80° F. At the end of 15 minutes the sample was removed from the solution briefly and the percentage of rust cleared area was estimated visually at approximately 50% of the total area. Then the sample was returned to the solution for another fifteen minutes at the end of which time the sample was again removed from the solution and the percentage of rust cleared area was estimated visually at 85% of the total area. The sample was returned to the solution for another twenty minutes at the end of which time the sample was again removed from the solution and the sample was substantially completely cleared of rust, i.e., estimated as 99% cleared of rust.

Example 2.—75 grams of sodium iodide and one gram of sodium hypophosphite were dissolved in a quantity of hot water to form a 50 milliliter solution. This makes a concentrated solution of the sodium iodide in water. While hot, 50 milliliters of concentrated hydrochloric acid were added. This makes a solution in which the iodide is about 75% by weight of the solution. The solution is not cooled prior to the addition of the hydrochloric acid, lest some of the sodium iodide separate out. After the acid is added, sodium chloride is precipitated. The solution was cooled to 80° F. and the precipitate that was formed was separated from the solution by decantation and filtration. Then one of the rust coated samples identified earlier above was immersed in the solution at 80° F. The sample was removed after ten minutes and was observed to be substantially completely cleared of rust, i.e., estimated as 99% cleared of rust.

*Example 3.*—A rust covered sample identified earlier above was immersed in a solution prepared as in Example 2 but with 50 grams of potassium iodide instead of 75 grams of sodium iodide and one-half gram of sodium hypophosphite. At the end of ten minutes the sample was removed, observed, and the area cleared of rust was estimated to be approximately 70 percent of the total area. Then the sample was returned to the solution for another five minutes at the end of which time the sample was removed, observed, and the area cleared of rust was estimated to be approximately 95% of the total area.

*Example 4.*— Two unrusted bare steel samples 1″ x 3″ x ⅛″ were weighed, and one was immersed in the solution as described in Example 1 and one was immersed in the solution as described in Example 2 both at 80° F. Both samples were removed from their solutions after one hour, washed, dried, and weighed. The weight lost by the sample immersed in the solution as in Example 1 was 95 milligrams. The weight lost by the sample immersed in the solution as in Example 2 was 10 milligrams. This proves that the presence of NaI inhibits attack of HCl on steel.

It is evident from the above results that the time in which aqueous hydrochloric acid solution on the order of 1:1 by volume can remove rust is susbtantially lessened by the addition of an iodide that is soluble therein in substantial amount. Also the amount of base metal lost in the rust removed process is substantially lessened. The quantity of iodide may be an amount up to that sufficient for a saturated solution. From the equation, it is evident that the iodide used may be any that is soluble to a substantial extent in the aqueous hydrochloric acid solution. When the rust removing solutions are used, free iodine is released and the color of the solutions gradually darken to a very dark brown color.

If ultrasonic energy is applied to the bath during a rust cleaning operation, the rust removal time is reduced still further; temperature rise reduces time.

The composition of matter described may be utilized other than as a bath. For example, it may be wiped on and then off and repeated several times when the acid in one application is not adequate to remove all the rust before the acid is dissipated.

After a ferrous article is rust cleaned, it is advisable to wash the article to remove any residual acid.

It will be understood that various changes in the details, material and steps, which have been herein described and illustrated in order to explain the nature of the invention, may be made by those skilled in the art within the principle and scope of the invention as expressed in the appended claims.

I claim:
1. A composition of matter for rust removal from ferrous metal articles consisting essentially of an aqueous solution formed by the mixture of about equal parts by volume of concentrated hydrochloric acid and an aqueous solution of sodium iodide in which the proportion of sodium iodide to water is about 75 grams to 50 milliliters of water.

2. The method for fast removal of oxides of iron from iron surfaces, which consists essentially of providing intimate contact with such oxides on such surfaces of a solution formed by the mixture of about equal parts by volume of concentrated hydrochloric acid and one of a group consisting of substantially saturated aqueous solutions of NaI, KI, NH$_4$I, and HI respectively, until the oxides of iron have been removed, then terminating such contact.

3. The method according to claim 2, in which the substantially saturated aqueous solution consists essentially of about 75 grams of NaI and about 1 gram of sodium hypophosphite per 50 milliliters of water.

4. A composition of matter for rust removal from ferrous metal articles consisting essentially of an aqueous solution formed by the mixture of equal parts by volume of concentrated hydrochloric acid and an aqueous solution of sodium iodide and sodium hypophosphite consisting of 75 grams of sodium iodide, 1 gram of sodium hypophosphite and 50 milliliters of water.

5. A composition useful for rapid removal of adherent oxides of iron from an iron surface which consists essentially of a solution formed by the mixture of about equal parts by volume of concentrated hydrochloric acid and one of a group consisting of substantially saturated aqueous solutions of NaI, KI, NH$_4$I, and HI, respectively.

References Cited by the Examiner
UNITED STATES PATENTS

| | | | |
|---|---|---|---|
| 2,257,186 | 9/41 | Orthner et al. | 252—105 |
| 2,472,684 | 6/49 | Rossi | 252—105 |
| 2,708,184 | 5/55 | Hager et al. | 252—147 |
| 2,878,146 | 3/59 | Certa | 252—146 Xr |

OTHER REFERENCES

Corrosion, vol. 6, No. 10 (1950), pp. 344–46. Article by Hager et al.

JULIUS GREENWALD, *Primary Examiner.*